Feb. 20, 1934.  R. LEDER  1,947,912
JEWELER'S CLAMP
Filed Aug. 27, 1930   2 Sheets-Sheet 1

INVENTOR
Rudolph Leder
BY his ATTORNEY

Feb. 20, 1934. R. LEDER 1,947,912
JEWELER'S CLAMP
Filed Aug. 27, 1930 2 Sheets-Sheet 2
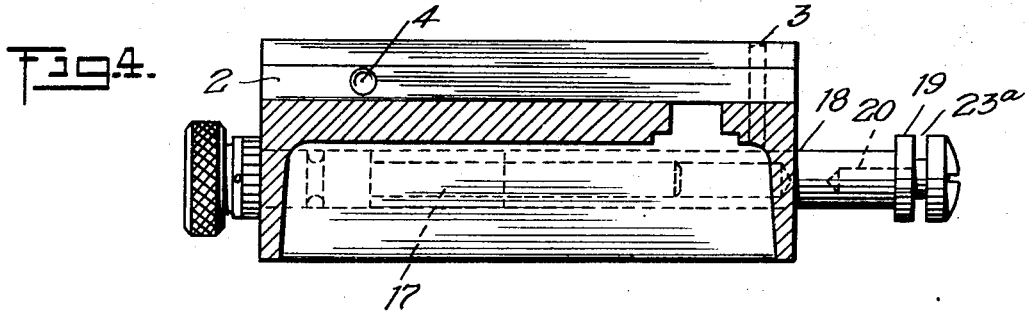
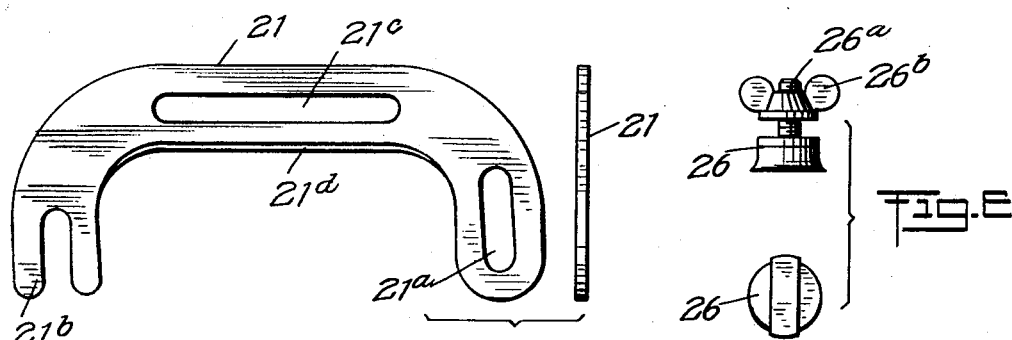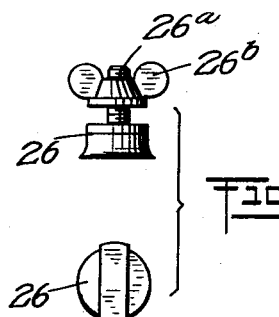
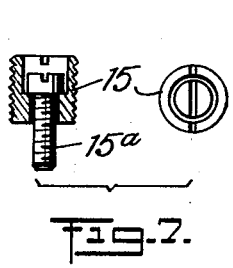 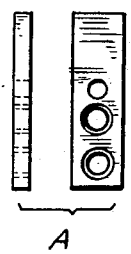 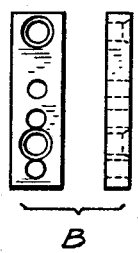 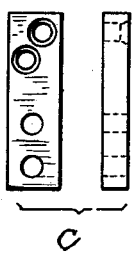
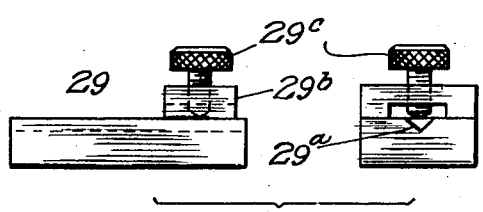 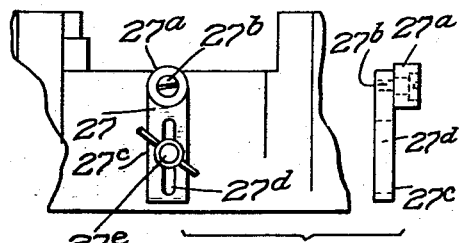
INVENTOR
Rudolph Leder
BY his ATTORNEY Patented Feb. 20, 1934

1,947,912

UNITED STATES PATENT OFFICE 1,947,912

JEWELER'S CLAMP

Rudolph Leder, New York, N. Y.

Application August 27, 1930. Serial No. 478,114

3 Claims. (Cl. 29—75)

This invention relates to a jeweler's clamp.

This clamp is made for the purpose of cutting sections of metal, especially flexible bracelets, or any other material, also rings and various kinds of jewelry, also wire, round, square or any other shape.

It is one object of my invention to provide a clamp with facilities for meeting the requirements of the manufacturing jeweler, in that it will act as a sawing machine for the cutting of metal, securing an accurate sawing which, in most instances, must be absolutely perpendicular or at any degree to the piece being made.

Another object of my invention is to provide a machine which will take saws of any width or thickness.

Another object of my invention is to provide a machine with one adjustable slide moving by means of one fixed spindle parallel with the cutting edge.

Another object of my invention is to provide a machine with one rack, swiveling on pivot in front of slide for the purpose of clamping tapered work.

Still another object of my invention is to provide a machine with adjustable jaw, swiveling on pivot at the end of fixed jaw and adjustable by two screws. This rack is used for holding tapered work parallel with cutting edge.

Another object of my invention is to provide a machine with adjustable saw plate guides screwed at the end of fixed jaw of body.

Another object of my invention is to provide a machine with one saw plate guide moving back and forth with slide.

Still another object of my invention is to provide a machine with regulation device for saw plate guide operated by means of two (2) screws, one of which is left-hand threaded and intended to regulate the distance between the two plates.

Another object of my invention is to provide a machine with a second right-hand threaded screw passing through the center of the first screws tightening the two plates of guide together.

Another object of my invention is to provide a machine with a conveyor for stop plate moving back and forth in a hole drilled through the entire length of the body.

Still another object of my invention is to provide a machine with one vernier spindle to regulate the stop plate at any desired distance from the saw.

Another object of my invention is to provide a machine with a stop plate parallel in front of cutting edge, swiveling around the end of a conveyor in button hole, thus providing space for saw frame when work is clamped in place. Another object of my invention is to provide a machine with an adjustable support to regulate the stop plate in parallel position with the cutting edge.

Still another object of my invention is to provide a machine with adjustable stop sliding between saw plate guides in slot of large stop plate suitable for the cutting of small pieces.

Still another object of my invention is to provide a machine between the two jaws of which there is a V block consisting of a plate grooved in V shape. At one end of this is affixed a bridge for the location of set screw. This block will be useful for cutting small articles such as wire, round, square or of any other shape, or size.

Still another object of my invention is to provide a machine with a saw stop on adjustable roller revolving around a screw. This saw stop is placed between the saw guides to prevent sawing too far down on certain pieces of work, especially intended for bracelet work when the bezel must not be cut throughout.

Another object of my invention is to provide a machine body with fixed jaw perpendicular with cutting edge.

This invention accordingly consists in the features of construction, combination of elements and arrangements of parts which will be exemplified in the construction hereinafter described, and of which the scope of application will be indicated in the following claims. In the accompanying drawings are shown the various possible illustrative embodiments of this invention.

Fig. 4 is a cross sectional view of body showing driving spindle and conveyor, taken on line 4—4 of Figure 2.

Fig. 5 is a face view of stop plate. Also a side view.

Fig. 6 is the front and side views of short stop.

Fig. 7 gives details of regulation screws on plate guides.

Fig. 8A shows front plate of saw guide giving front and side views.

B shows back plate of saw guide on fixed jaw.

C shows back plate of saw guide on sliding jaw.

Fig. 9 is an elevation of a V block.

Fig. 10 front and side views of button controlling depth of sawing.

Figure 1:
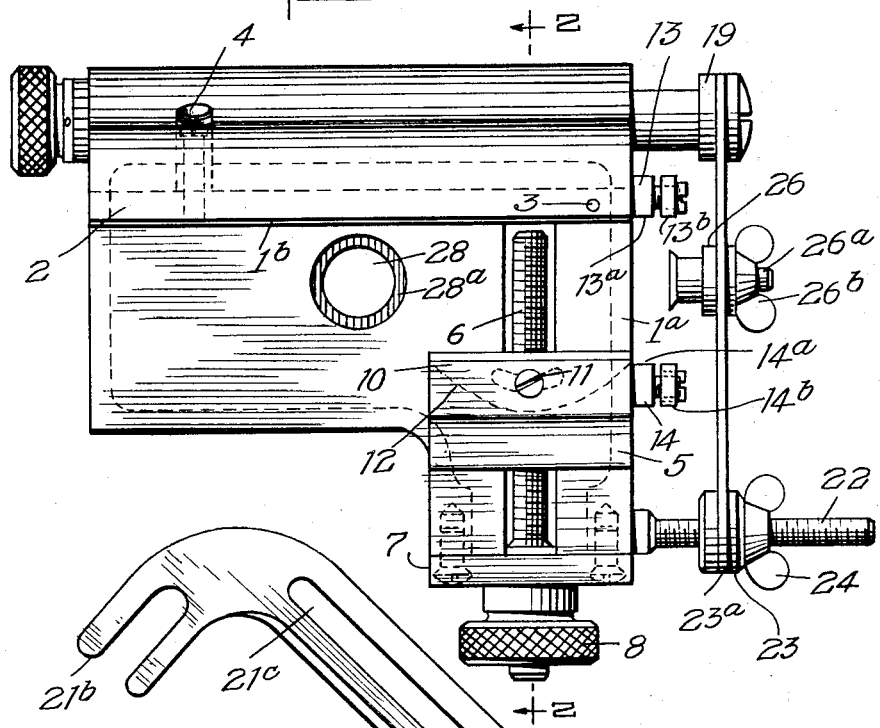
Fig. 1 is a top plan view of a clamp embodying the invention showing the large stop plate in closed position.
Figure 2:
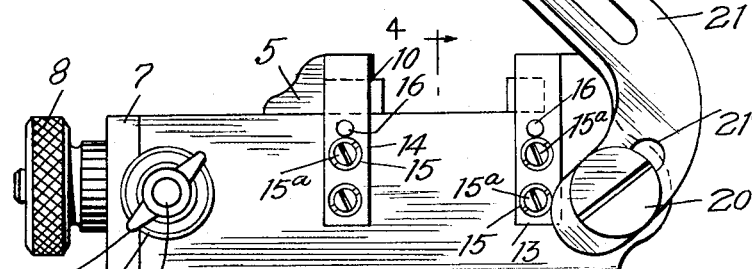
Fig. 2 is a front elevational view showing the large stop plate in open position, also front view of saw guides in position.
Figure 3:
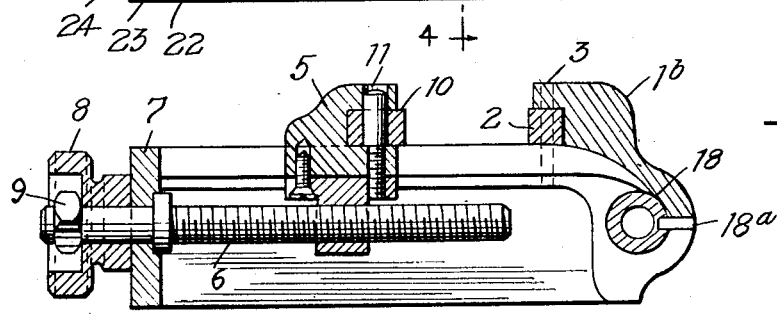
Fig. 3 is a front sectional view showing the adjusted jaw inserted inside the fixed jaw, also the rack inserted into the sliding jaw, taken on line 3—3 of Figure 1.

Referring in detail to the drawings, Fig. 1 denotes a body, cast or otherwise, made of any metal and of any size, of which two sides, (1a) and (1b) have been faced square. One of these sides, as (1b), may be considered a fixed jaw. On the fixed jaw is inserted an adjustable jaw (2) pivoting as at (3) at one end of the fixed jaw and adjustable at the other end by screws (4). Opposed to the fixed jaw is a sliding jaw (5) moving by means of a spindle (6) running in a slot across the body transverse to the jaws. This spindle has a steady location by means of a stop plate (7) on the front of the body at the end of the slot. Action is given to spindle (6) by a knob (8) fastened by a lock nut (9). On the lower part of the sliding jaw a rack (10) is adjusted for the purpose of securing an article having a slant or of tapered shape, taking the degree or slant of the article, therefore securing it firmly between the jaws. This rack is thus working in conjunction with the adjustable jaw (2) or alone. In this latter case it may be used for straight line work or an edge which may not be absolutely straight. Its position holds the piece firmly on the entire length of the jaw. It is adjusted by means of a pivot (11) and swiveled around the pivot into a spherical slot or groove, (12). The article being firmly secured between these two jaws may be sawed in any number of sections. To this effect two saw guides are adjusted, first one on the side of the fixed jaw (13) and the second one (14) on the side of the sliding jaw. They are each secured by two screws (15). These guides consist of two (2) hardened plates (13a) and (13b) and (14a) and (14b). Each pair of plates has two sets of adjusting screws, (15) and (15a) for the purpose of regulating the distance between the two plates according to the width of the saw to be used. To perform this regulation the set screw (15) which is left-hand threaded, is threaded through the outer plate and abutting the inner plate and thereby secures an exact distance between the two plates. Screws (15a) which are right-hand threaded are each axially connected with the set screw, the heads of the inner screws entering in pockets in the outer screws and resting on shoulders and locking the two plates in position. A hardened pin (16) is provided, running through the two plates for securing an exact location. This pin projects from the outer plates as to also protect the set screws directly below from any damage which may be caused by the saw. The article to be sawed is often divided or cut in pieces of the same size. The length of these pieces is regulated by the device described below:

The dividing device is composed of a threaded spindle (17) inserted in the body parallel to the fixed jaw preferably beneath the same, and cooperating with a conveyor (18) aligned therewith inserted from the opposite side of the body. As here shown, the spindle enters a threaded hole in the contiguous end of the conveyor and both the conveyor and spindle are in a common hole through the body.

The outer end of the conveyor is provided with a shoulder (19) inside of which runs a screw (20) for mounting a stop plate (21) spaced from and parallel to the side face of the body. A slot (21a) at the end of the stop plate, and through which the shank of said screw (20) passes, maintains the stop plate in position allowing motion up and down. On the same side of the body portion with the conveyor and spaced from the conveyor, is a fixed screw (22) upon which is threaded a roller (23). Midway of the length of the roller is a peripheral groove (23a) into which drops the end of the stop plate (21b), the roller being adjusted for the purpose of screwing it in or out as necessary to bring the plane of the groove and plane of the stop plate, coincident. A lock nut (24) on the same screw secures the roller firmly in adjusted position. The center of the stop plate is provided with a slot (21c). In that slot runs a butee (26) secured in any position by means of a screw (26a) and wing nut (26b). The bottom of the stop plate is shaped in knife edge (21d). The knife edge is necessary when the clamp is used for the following operations:

For example—when a bracelet is to be cut in several sections and when these sections must be of the same size. Very often, according to the kind of work wanted, the cutting apart is only on the top, or at least leaving uncut a portion of bezel at the bottom. This keeps the piece rigid all the way, allowing the putting up of the joints and any other work, preventing any misplacement or distortion. When the work is finished then the sections are liberated in sawing the preserved small portion of the bezel. To divide and cut the sections accurately the stop plate is placed directly upon the first cut dropping its knife edge into it. The same operation is repeated after sawing the second section, and so on to the end of the bracelet.

In order to preserve the slight part of the bottom (bezel) and where that part of the bracelet is to be left uncut, the depth of the cut is controlled by a button (27). This button consists of a roller (27a) turning around a screw (27b) secured on a plate (27c). The plate holding the roller is screwed on the side of the body directly below and between the saw guides. The plate is provided with a slot (27d) and the use of one screw only (27c) allows the position of the roller in any degree and any height. On the center of the body is countersunk a hole (28) with a shoulder (28a) through which a bolt is placed for the purpose of fastening the machine on the bench or any other support. Between the two jaws may be placed a V block (29) Fig. 9 consisting of a plate grooved in V shape as at (29a). At one end of the block is affixed a bridge (29b) for the location of a set screw (29c). This block will be useful for cutting small articles such as round or square wire, or wire of any other shape.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A device as characterized comprising in combination a body having a fixed and a movable jaw for clamping work therebetween, plates at the ends of the said jaws having screws for retaining said plates in separated fixed position for receiving a saw therebetween, said screws being adjustable for separating said plates more or less with respect to each other and also with respect to the body, and pins projecting between the plates above the screws for both maintaining the relative position of the plates and preventing the screws from being injured by the saw.

2. A device as characterized comprising in combination a body having a fixed jaw and a movable jaw for clamping work therebetween, plates at the ends of said jaws having means for retaining said plates in separated fixed position for receiving a saw therebetween, said means comprising a pair of screws one within the other, said screws being adjustable for regulating and separating said plates more or less with respect to each other and also with respect to the body.

3. A device as characterized comprising in combination a body having a fixed jaw and a movable jaw for clamping work therebetween, plates at the ends of said jaws having means for retaining said plates in separated fixed position for receiving a saw therebetween, said means comprising a pair of screws, one of said screws being provided with left-hand threads and adapted to be threaded through one of the plates and abut against the other plate, the other said screw adapted to axially connect with the first said screw for locking the plates whereby said screws are adjustable for regulating and separating said plates more or less with respect to each other and also with respect to the body.

RUDOLPH LEDER.